United States Patent [19]

Tsikos et al.

[11] Patent Number: 5,065,237
[45] Date of Patent: Nov. 12, 1991

[54] EDGE DETECTION USING PATTERNED BACKGROUND

[75] Inventors: Constantine J. Tsikos, Voorhees Township, Camden County; Brian R. Frederick, Pennsauken Township, Camden County; Timothy J. Davis, Mansfield Township, Burlington County, all of N.J.

[73] Assignee: General Electric Company, Moorestown, N.J.

[21] Appl. No.: 561,405

[22] Filed: Aug. 1, 1990

[51] Int. Cl.⁵ .............................................. H04N 7/00
[52] U.S. Cl. ................................... 358/101; 358/107; 358/93; 209/900; 209/586
[58] Field of Search ................. 358/101, 106, 107, 93; 209/900, 584, 586, 939

[56] References Cited

U.S. PATENT DOCUMENTS

| | | | |
|---|---|---|---|
| 3,674,924 | 7/1972 | Fischer et al. | 358/93 |
| 3,868,478 | 2/1975 | Zeenkov | 358/93 |
| 3,873,812 | 3/1975 | Stein et al. | 358/93 |
| 4,171,744 | 10/1979 | Hubbard | 209/900 |
| 4,254,433 | 3/1981 | Dewar, Jr. et al. | 358/101 |
| 4,414,566 | 11/1983 | Peyton et al. | 358/101 |
| 4,503,976 | 3/1985 | Cloud et al. | 209/900 |
| 4,613,942 | 9/1986 | Chen | 358/101 |
| 4,663,658 | 5/1987 | Lanne et al. | 358/101 |
| 4,693,378 | 9/1987 | Azegami et al. | 358/107 |
| 4,803,371 | 2/1989 | Durland . | |

Primary Examiner—James J. Groody
Assistant Examiner—Michael H. Lee
Attorney, Agent, or Firm—William H. Meise

[57] ABSTRACT

An apparatus for singulating mailpieces such as envelopes spread out on a moving conveyor belt includes a robot for picking up the mailpiece associated with a leading edge. The conveyor belt has alternate black-and-white longitudinal stripes. A TV camera views the belt surface, and produces video representing the stripes and any mailpieces. The video is processed to produce signals representative of the locations of transitions in the video along the centers of the black and/or white stripes. The location representative signals are processed by calculating lines corresponding to one or more leading edges of the mailpiece, which may then be used for controlling the robot in known manner.

18 Claims, 6 Drawing Sheets

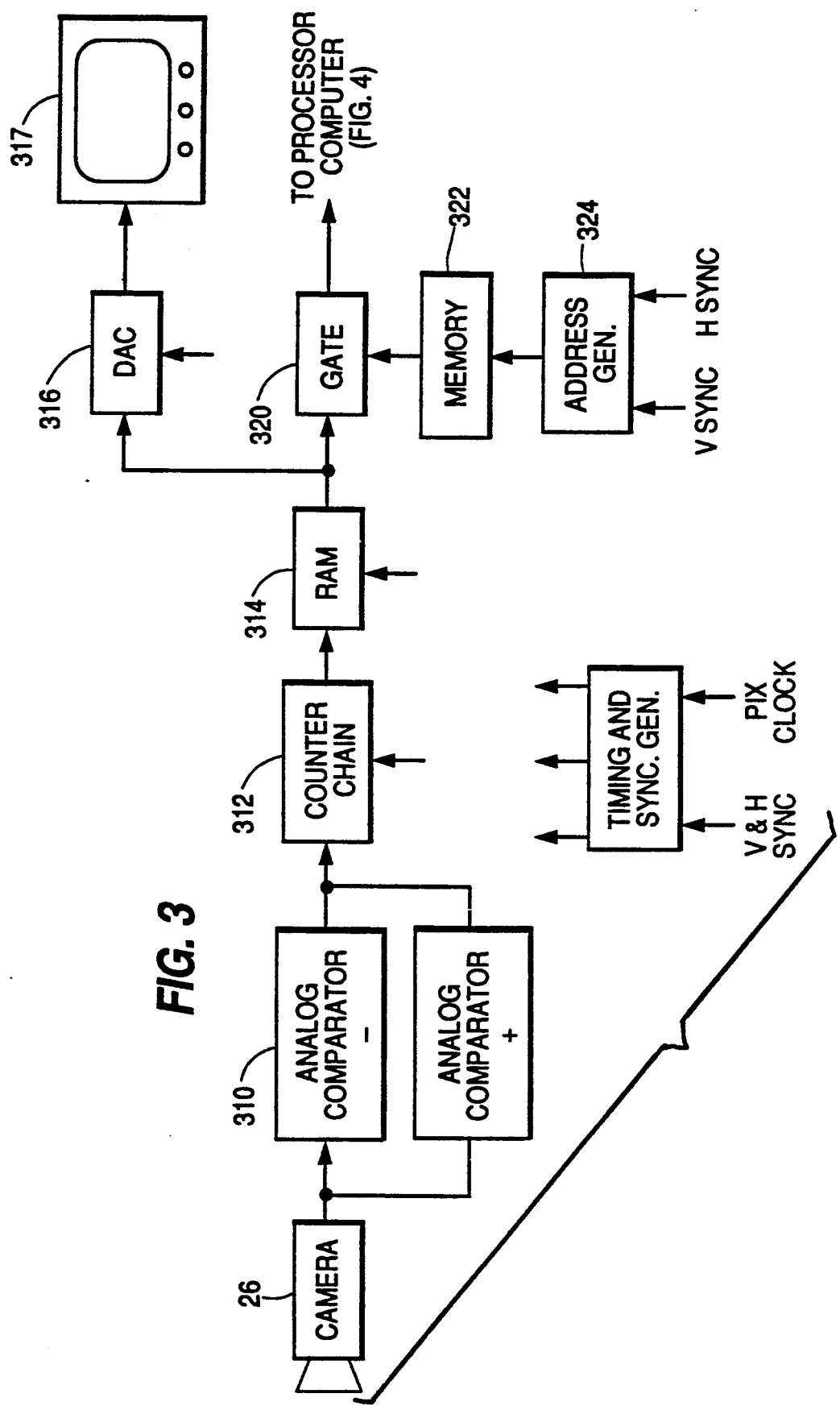

EDGE DETECTION USING PATTERNED BACKGROUND

The Government has rights in this invention pursuant to Contract No. 104230-84-D-0929 with the United States Postal Service.

BACKGROUND OF THE INVENTION

Considerable attention has been directed toward automated handling of mail. The automated handling of mail is a complex problem with many parts. No one singulation method alone appears to be a solution for all conditions. Instead, it appears that automated mail handling will require a combination of many different techniques. Thus, simplicity, cost and robustness become important considerations. Another aspect of the problem lies in identification of the shape and location of mailpieces which may have been dumped for sorting. This problem is exacerbated by the varied nature of mailpieces, ranging from single sheets of paper to magazines which are bound along one edge, letters of various sizes, and packages. Robots must be available which are capable of separating one piece of mail from another, picking up mailpieces as may be required without damage, and transporting them to appropriate locations such as bins.

One of the identification problems arises when boxes of envelopes are dumped onto a conveyor belt, and "fanned" in the direction of motion of the conveyor so as to generally separate the leading edges of one envelope from the other, leaving them substantially overlapped. A simple and robust arrangement for identifying the leading edge of a mailpiece is desired, using ordinary diffuse illumination such as is found in ordinary work places, without recourse to scanning, lasers, and the like.

SUMMARY OF THE INVENTION

An apparatus for manipulating substantially flat, rectangular work pieces such as envelopes and single sheets includes a support surface for the workpieces. In a particular embodiment, the support surface is a conveyor belt. The support surface is patterned with parallel, mutually contrasting elongated stripes. A transport arrangement is coupled to at least the workpieces for causing motion of the workpieces in a direction parallel with the stripes. In the embodiment using a conveyor belt, the transport arrangement includes a motor which drives the conveyor belt or moving web. An imaging arrangement is optically coupled to at least a portion of the support surface for imaging the portion and such workpieces as may be thereupon, and such portion of the stripes as may be visible. The imaging arrangement generates video signals representing the image. A transition signal processor is coupled to the imager for processing the video signals in order to generate location signals which represent the location of the interruption of at least some of the stripes by an edge of the workpiece. In the conveyor embodiment, the workpiece is a mailpiece such as an envelope, and the edge is a leading edge. A further processor is coupled to the transition signal processor for generating data representative of the location of the leading edge. A manipulator responds to the data from the further processor to pick up a workpiece.

DESCRIPTION OF THE DRAWING

FIG. 3 is a block diagram of an arrangement for processing video signals in conjunction with the arrangement of FIG. 1 to produce signals associated with each stripe, indicating the position of the leading edge of an envelope;

DESCRIPTION OF THE INVENTION

Figure 1:
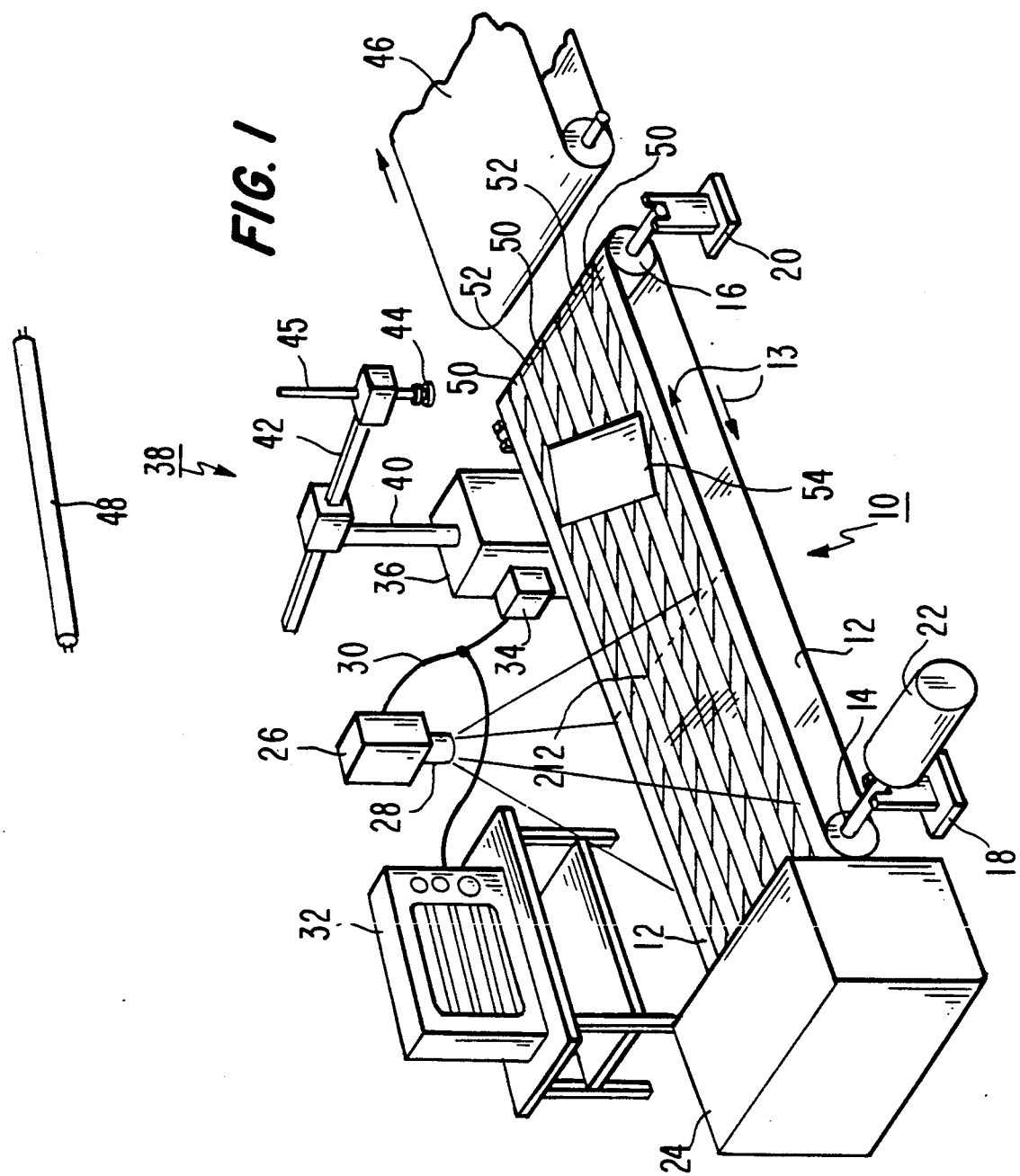
FIG. 1 is a perspective or isometric view of an arrangement according to the invention, including a conveyor belt patterned with contrasting longitudinal stripes which conveys envelopes.

FIG. 1 illustrates a mail processing work station for mailpiece singulation or manipulation. In FIG. 1, a conveyor arrangement designated generally as 10 includes an endless belt 12 supported by drive rollers 14 and 16 which are, in turn, supported by support legs 18 and 20, respectively. A motor illustrated as 22 drives roller 14 to cause motion of endless belt 12 in the direction indicated by arrows 13. A workpiece feed arrangement is illustrated as a box 24. As mentioned, feed arrangement 24 may dump envelopes onto the upper surface of conveyor belt 12 in a manner which "fans" them in the direction of conveyor motion. An imaging arrangement illustrated as a television camera 26 with a lens 28 images a portion of the upper surface of conveyor belt 12. Camera 26 converts the image into video signals which are coupled by a data path 30 to a television monitor 32 and to a signal processor 34 which, for convenience, is attached to the base housing of an article handling robot, designated generally as 38. Robot 38 includes a controllably rotatable mast 40, an extendible arm 42, and a vacuum cup 44 on the end of an adjustable-height arm 45. Robot 38 is provided for grasping articles identified by camera 26 and processor 34, and for transferring them one at a time to an output conveyor 46. General illumination of the work station by diffused light is suggested by a fluorescent tube 48 above the work station. Naturally, the general illumination may come from windows, skylights, or plural incandescent sources located throughout the room in which the work station is located.

In accordance with the invention, the upper surface of conveyor belt 12, upon which the workpieces are supported, is patterned with longitudinal contrasting stripes 50 and 52. As illustrated in FIG. 1, the pattern consists of a repeating array of alternate light stripes 52 and dark stripes 50, the stripes extending in the direction of motion of the conveyor. A mailpiece designated 54 is illustrated as being carried by the conveyor.

Figure 2:
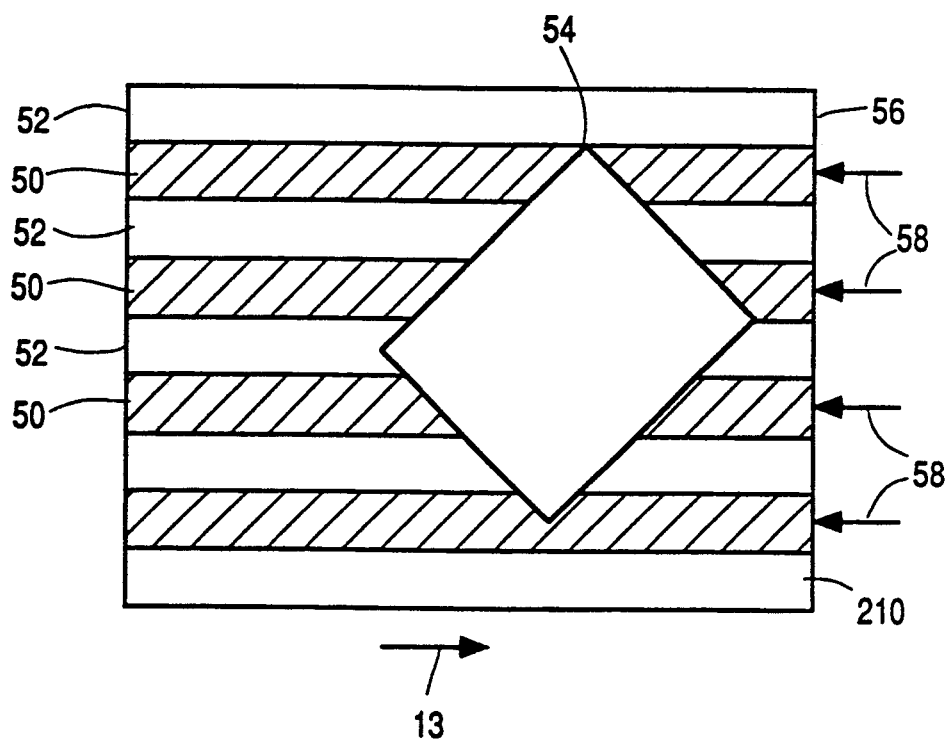
FIG. 2 illustrates a representative image of stripes and workpiece as seen on a television monitor in FIG. 1.

FIG. 2 represents the image which would be seen on monitor 32 of FIG. 1 at a time when workpiece 54 happened to be within the field of view of camera 26. Elements of FIG. 2 corresponding to those of FIG. 1 are designated by the same reference numerals. Right edge 210 of the image region corresponds to the position of an imaginary line such as dotted line 212 of FIG. 1, extending across the conveyor belt at an edge of the camera image region. In general, the location of the leading edge of workpiece 54 on the conveyor may be determined by measuring between the right edge 210 of the image region, parallel with each stripe, and measuring the distance to the location at which a stripe terminates. Although only four black stripes and five white stripes are illustrated, those skilled in the art will understand that the number of stripes must be sufficient so that a sufficient number of stripes intersect the smallest edge which is likely to be encountered on a workpiece. Thus, about 24 stripes in 12 inches might be used when the largest mailpiece is expected to be a 9"×12" envelope, and the smallest a 3"×5" envelope. Thus, the 3" edge of the small envelope, at a 30° angle to the direction of motion, would intersect about 4 stripes.

If the television camera is arranged with the line-scan direction parallel with the stripes, the video content of each line-scan will represent either all-light or all-dark in the absence of a workpiece within the image region. Since the television camera may be slightly tilted with respect to the stripes, line-scans near the edges of a stripe may have a cross-over between light and dark within the image region. For this reason, it is desirable to ignore line-scans near the edges of stripes. This may be accomplished by measuring the distance between right edge 56 of the image region and the edge of the workpiece only at locations centered on each stripe. Some such locations are indicated by arrows 58 in FIG. 2.

FIG. 3 is a simplified block diagram of a video processing apparatus for use in conjunction with camera 26. In FIG. 3, video produced by camera 26 is applied in parallel to a pair of analog comparators illustrated as blocks 310 and 311, which compare the magnitude of the analog video signal with reference signals. Envelope 54 is assumed to be either all-black or all-white. With this assumption, four possibilities arise; scanning a white stripe surmounted by a white envelope, scanning a white stripe with a black envelope, scanning a black stripe with a white envelope, and scanning a black stripe with a black envelope. Comparator 310 is adapted for responding to transitions occurring during scanning of a white envelope, by virtue of a threshold which is slightly greyer than white. the off-white threshold prevents noise during scanning due to dirt on the moving web. For a similar reason, the threshold of comparator 311 is set somewhat greyer than black, for responding to scanning of the black stripes. Comparators 310 and 311 are arranged to produce output transitions of the same polarity so the outputs may be paralleled.

The transitions produced by comparator 310 are applied to a counter chain illustrated as a block 312. Counter chain 312 is reset by horizontal sync, and counts clock pulses produced by a timing and synchronization circuit illustrated as a block 308, for thereby establishing the time between horizontal sync (one edge of the image in FIG. 2) and a transition on one of these stripes. Counter chain 312 produces a series of data words representing the time, and therefore the distance, between horizontal sync and the transition caused by the presence of an edge of a mailpiece. A word is produced for each horizontal scan of the camera.

The data words produced by counter chain 32 of FIG. 3 are applied to a dual-ported RAM illustrated as a block 314. A dual-ported RAM for this purpose is one which may be read from and written into simultaneously. RAM 314 stores the digital words produced by counter chain 312 for application to a digital-to-analog converter (DAC) 316 and to a gate 320. DAC 316 converts the data words to analog video. The grey level of the video produced by DAC 316 is indicative of the time, and therefore the distance between horizontal sync and the transition representing the leading edge of the mailpiece. Thus, the intensity of the analog video produced by DAC 316 is representative of distance, with darker intensities representing greater distance and lighter intensities representing less distance. The analog video produced by DAC 316 is applied to a video monitor illustrated as 317 for monitoring the intensity information. It should be noted that the intensity information, when illustrated on monitor 317, will have the general appearance of stripes similar to, but different from the stripes illustrated by monitor 32.

Gate 320, in conjunction with a preprogrammed memory 322 and an address generator 324 > gates out all data words except those words corresponding to the centers of the stripes 50 and 52 on the surface of the moving web. Memory 322 is preprogrammed with logic one or logic zero data at each accessible memory location. One memory location is allocated for each horizontal scan of the camera, for a total of 525 memory location for NTSC-standard television signals. The addressed memory location produces a logic one or a logic zero, which is applied to the control input terminal of gate 320. A logic one represents opening of the gate, and a logic zero represents closing of the gate. An address generator illustrated as a block 324 is reset by vertical sync, and counts horizontal line pulses for producing a recurrent cycle of 525 horizontal-line-synchronized addresses. The memory locations are therefore scanned in synchronism with camera horizontal line scans. Only those memory addresses accessed by horizontal line synchronization pulses corresponding to the centers of the stripes on the moving web are programmed with logic one data, and all others are preprogrammed with logic zero data. Thus, gate 320 allows only those data words to pass which are representative of leading edge information derived from horizontal line scans near the centers of the stripes on the web.

Figure 4A:
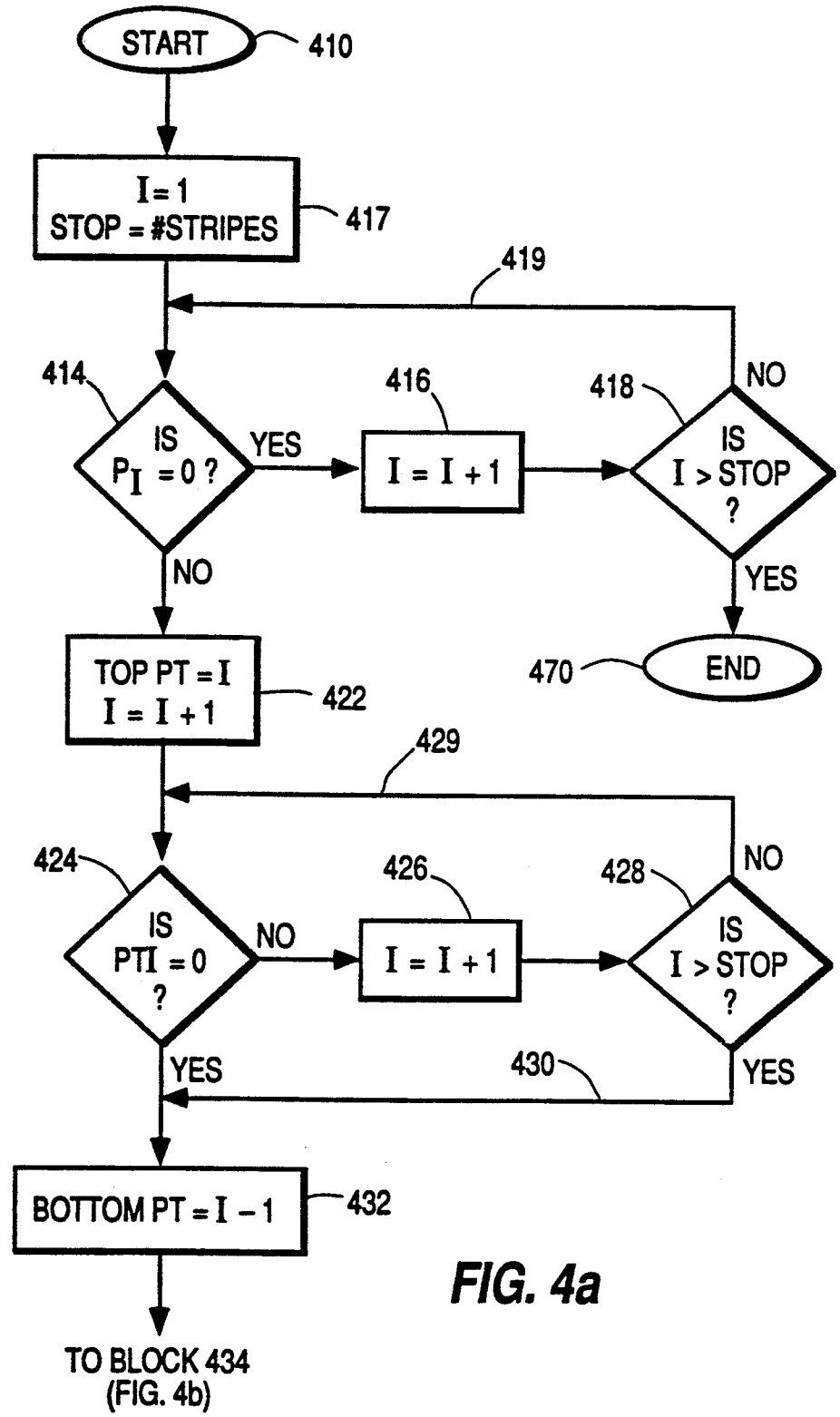
FIGS. 4a and 4b, referred to jointly as FIG. 4, together constitute a flow chart illustrating signal processing for generating data representative of the location of at least one edge of the mailpiece.

FIG. 4 is a simplified block diagram of a flow chart for determining the locations of the edges of an object from the gated video data. The logic flow of FIG. 4 is assumed to be fast enough so that the processing to determine edge location occurs essentially instantaneously, so that movement of the conveyor web does not influence the calculation. If this is not the case, the web may be stopped during the calculation. In FIG. 4a, logic starts at a start block 410 and proceeds to a block 412. Block 412 represents the setting of a running variable I to a value of 1. The value of a variable STOP is set to equal the number of 5 stripes in the image of the web. The logic flows to a decision block 414, which compares the data value for the Ith data word ($P_I$) issuing from gate 320 of FIG. 3 with zero. The data value or data point is the measurement of the position of the leading edge of the mailpiece along the Ith stripe. A value of zero means that no transition was found on the particular stripe in question; and therefore no portion of the work piece overlaid that stripe. If the value of word $P_i$ is equal to zero, the logic leaves decision block 414 by the YES path and flows to a further block 416, in which the current value of I is incremented by one. The logic then reaches a decision block 418 which compares the current value of I with the STOP value. So long as the current value of I has not reached the stop value, the logic leaves decision block 418 by the NO output and flows by way of a path 419 back to decision block 414. If the STOP value is reached before a finite value of $P_I$ is found, there is no mailpiece in the image, and decision block 418 routes the logic by its YES output to STOP block 420. The logic then restarts at START block 410.

Figure 5:
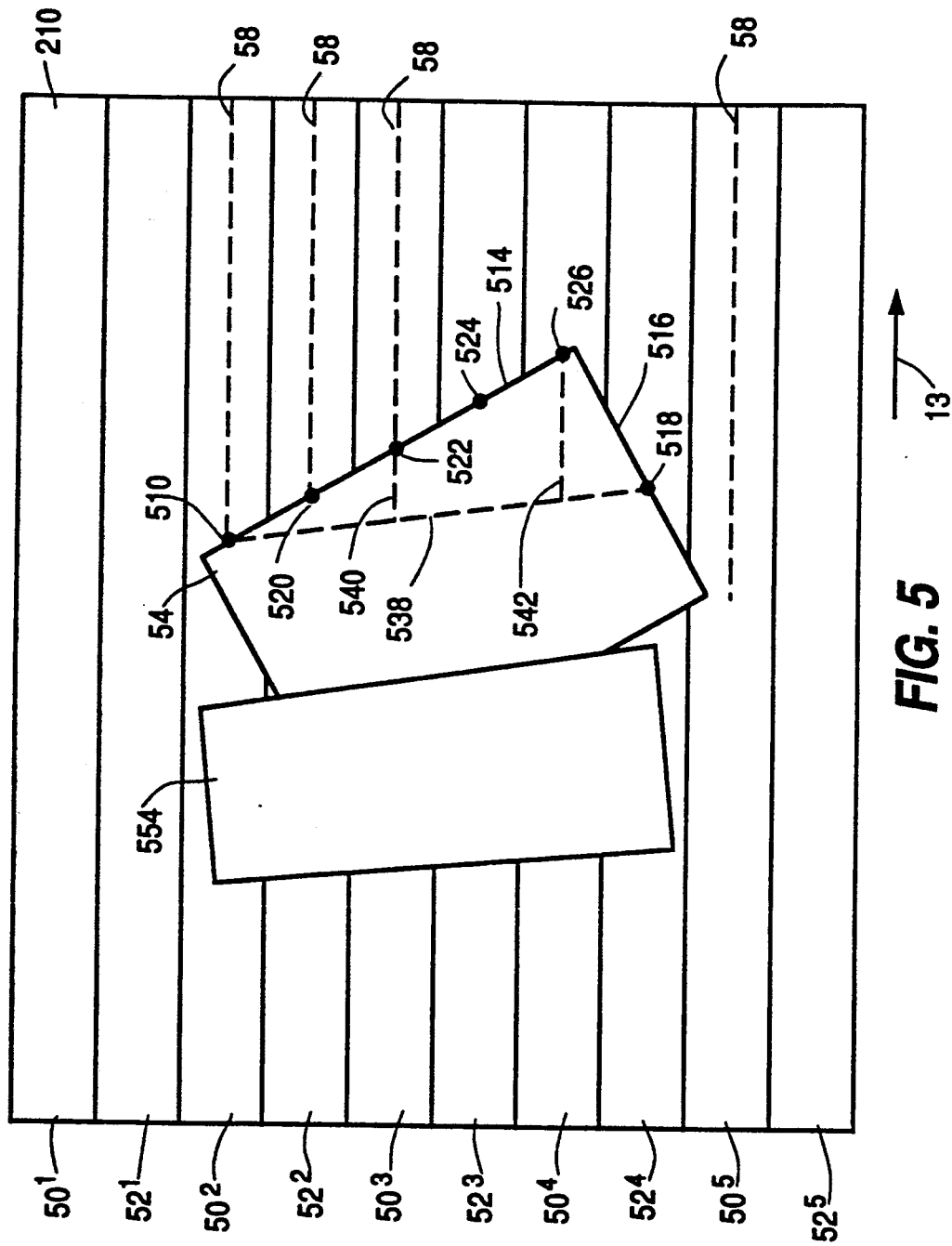
FIG. 5 is a depiction of mailpieces on the conveyor, with construction lines for explaining the operation of the logic of FIG. 4.

Eventually, the data words will assume finite values, indicating that a mailpiece has been found along a stripe. When the data word $P_I$ is non-zero, the logic leaves decision block 414 by the NO output, and arrives at a further block 422. Each value of $P_I$ occurs on a particular stripe I, so that each finite value of $P_I$ corresponds to an I. Block 422 sets the value of a variable TOP PoinT (TOP PT) equal to the current value 35 of I, that is, the first non-zero value of $P_I$. FIG. 5 is a skeletonized representation of the imaged region of camera 26 of FIG. 1. In FIG. 5, elements corresponding to those of FIGS. 1 and 2 are designated by the same reference numerals. In FIG. 5, mailpiece 54 is shown as the leading mailpiece, the lagging edge of which is overlain by another mailpiece 554. The value of TOP PT defines the stripe having the first finite value of $P_I$, namely stripe $50^2$ in FIG. 5. The correspond value of $P_I$ defines a mailpiece edge at a distance from right edge 210 of the image, at a location which is illustrated in FIG. 5 as point 510. Point 510 is the uppermost intersection of the upper leading edge 514 of the mailpiece with the center 58 of a stripe (50 or 52). Note that the location of point 510 is established by two known locations, (a) the value of TOP PT, which identifies the particular stripe (in this case $50^2$) to which the measurement relates and (b) the value of $P_I$, which expresses the distance of point 510 from right edge 210. Variable TOP PT is set equal to the current value of I and the value of I is incremented by one in block 422 of FIG. 4a. The logic flows from block 422 to a further decision block 424.

Decision block 424 compares the value of data point $P_I$ with zero, searching for the next zero-value data point, representing a location adjacent the bottom of the object. So long as the data points following TOP PT have finite value, the logic leaves decision block 424 by the NO output, and arrives at a block 426, in which the value of I is incremented. The incremented value of I is applied to a decision block 428 which compares the incremented value of I with the STOP value. So long as the STOP value has not been reached, the logic leaves decision block 428 by the NO output and loops by a logic path 429 back to decision block 424. If the STOP value is reached before a non-zero data value is found, this means that the mailpiece extends all the way to the last stripe. In this event, the logic leaves decision block 428 by the YES output, and proceeds by logic path 430 to block 432. On the other hand, if, eventually, a stripe without finite values of data is reached, indicating a stripe which the mailpiece does not overlie, the logic leaves decision block 424 by the YES output and arrives at block 432. In FIG. 5, stripe $50^5$ is the first stripe below the bottom of the mailpiece, which would result in the logic leaving decision block 424 by the YES path.

Regardless of the path by which the logic arrives at block 432, it sets a second variable bottom point (BOTTOM PT) equal to the current value of I minus 1. This identifies the bottom-most stripe which the object overlies, corresponding to stripe $52^4$ of FIG. 5. Note that, while mailpiece 54 actually overlies stripe $50^5$ as illustrated in FIG. 5, it does not overlie its center 58, which is where the measurement of $P_I$ is made. From block 432, the logic flows to block 434 of FIG 4b.

Figure 4B:
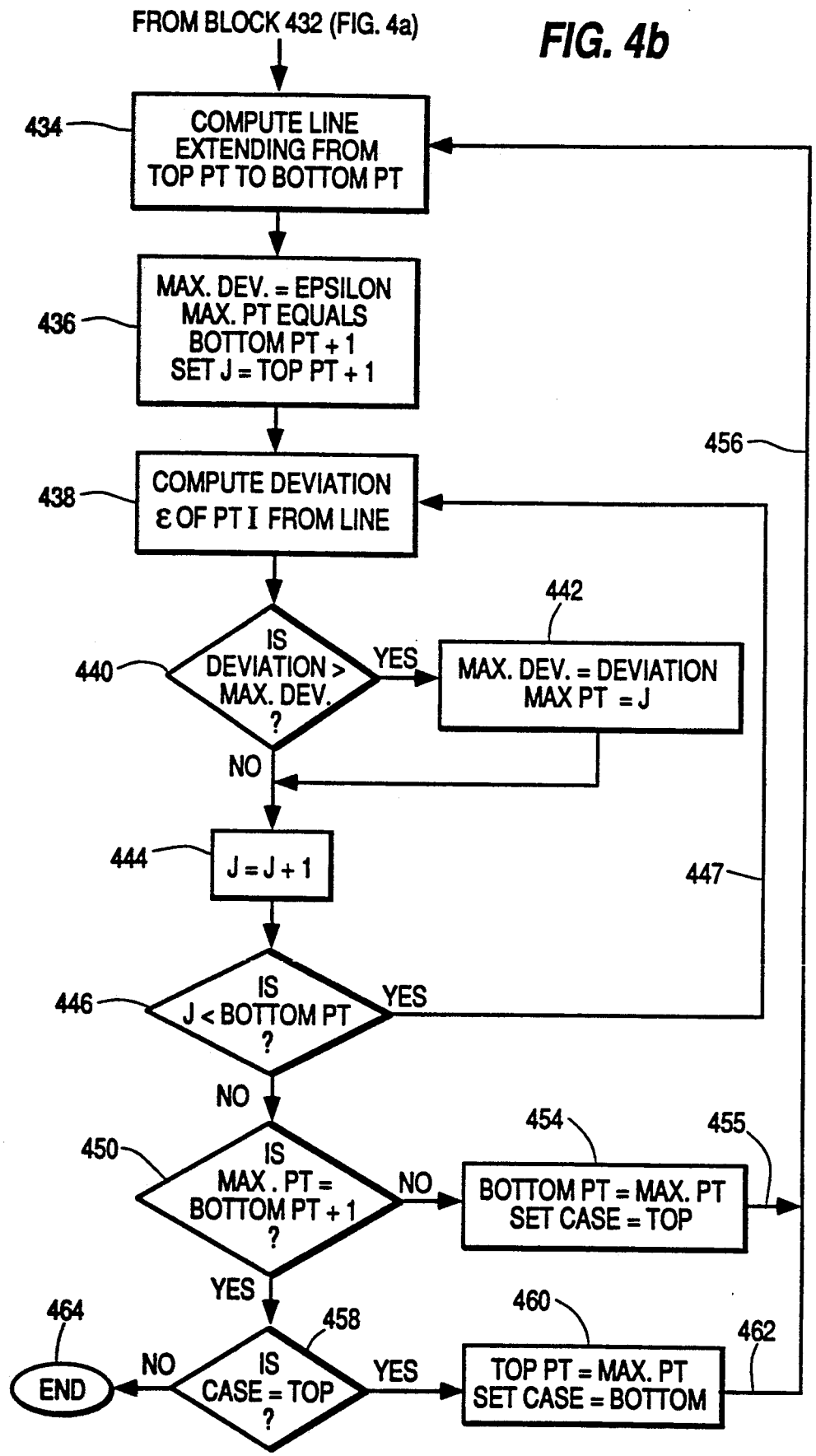

Block 434 of FIG. 4b represents computation of a line extending from top point to bottom point. This line is computed without taking into account any intermediate data points. The line computed in block 434 is represented by dash line 538 in FIG. 5, and extends from TOP PT 510 to BOTTOM PT 518. Calculated line 518 is a first approximation of the leading edge of mailpiece 54. If mailpiece 54 were in a different position from that illustrated in FIG. 5, for example with point 526 at the location of point 518, line 528 would coincide with leading edge 514 of mailpiece 54. Because of its position, however, mailpiece 54 has two leading edges, namely 514 and 516.

Block 436 represents the initialization of three variables. The variables are MAXimum DEViation (MAX DEV), MAXimum PoinT (MAX PT), and J. Variable MAX DEV is initialized to an initial epsilon ($\epsilon$), which is the smallest value which is to be considered as different from the line, MAX PT is set to BOTTOM PT (as calculated in block 432) plus one, and J is set to TOP PT plus one. Thus, J is a running variable which represents stripes, counting from the stripe in which the first finite value of PJ is found. In FIG. 5, TOP PT is stripe $50^2$ and J=TOP PT plus one is stripe $52^2$.

Block 438 represents computation of deviation $\epsilon$ of the Jth point (510, 518, 520, 522, 524, 526,...) from the calculated line. In FIG. 5, the deviation $\epsilon$ of point 522 from calculated line 538 is illustrated by the length of dash line 540. The position of point 522 along centerline 58 of stripe $50^3$ is determined by the value of $P_J$. The value of maximum deviation is compared With deviation $\epsilon$ in decision block 440 of FIG. 4b. If the currently calculated deviation $\epsilon$ is greater than the previous MAXimum DEViation, the logic leaves decision block 440 by the YES output and arrives at a block 442. In block 442, the value of MAXimum DEViation is set to match the current, larger, calculated deviation $\epsilon$, and the value of MAXimum PoinT is set equal to the current value of J. Thus, J identifies the stripe having the point (established by $P_J$) which deviates by the greatest amount from the calculated line (538). From block 442, or from the NO output of decision block 440, the data arrives at a further block 444. Block 444 increments the current value of J by one to continue searching for the maximum deviation. Decision block 446 compares the current value of J with BOTTOM PT. If J is less than BOTTOM PT, or in other words has not yet reached BOTTOM PT, the logic leaves decision block 446 by the YES path and proceeds by a logic path 447 back to block 438. The logic flows about a loop including blocks 438 through 446 and return path 447 until the bottom-most stripe is reached which has finite data values $P_I$ (corresponding to stripe 524 of FIG. 5). During the looping, the value of MAX DEV is established as the maximum of the deviation. In FIG. 5, MAX DEV would be established as the $\epsilon$ represented by dash line 542, and MAX PT would be the J corresponding to stripe $50^4$, in which point 526 and MAX DEV lie.

If the current J is greater than or equal to BOTTOM PT, the logic leaves decision block 446 by the NO 5 path. The logic then arrives at a decision block 450. In decision block 450, in the current value of MAX PT is compared with BOTTOM POINT plus one. If MAX PT<BOTTOM PT plus one, this means that there is more than a single leading edge of the mailpiece, as illustrated by leading edges 514 and 518 of FIG. 5. The logic leaves decision block 450 by the NO path and reaches a further block 454. A new BOTTOM PT is defined in block 454, which is the MAX PT. The logic then loops back along a logic path 456 to block 434, to begin another pass through blocks 434-450.

A flag entitled CASE has two possible states; TOP CASE and BOTTOM CASE, corresponding to the number of possible leading edges. A rectangular mailpiece such as an envelope can have one leading edge (if an edge is perpendicular to the direction of motion of the moving web) or two leading edges, as illustrated by 514 and 516 of FIG. 5. The CASE flag is set to TOP CASE in block 454, corresponding to entry into a loop by way of logic paths 455 and 456, back to block 434.

The second pass from block 434 to block 450 includes calculation, in block 434, of the equation of a line extending from point 510 of FIG. 5 to point 526, which is the new BOTTOM PT. The deviations of points 520, 522 and 524 from the calculated line should not be large, and when the logic arrives a second time at decision block 450, MAX PT will still equal BOTTOM PT plus one, which is the value which was assigned in block 436. The logic will flow from decision block 450 by the YES path. During this pass, the line calculated in block 434 corresponds to upper leading edge 514 of FIG. 5. The lower leading edge 516 remains to be calculated.

From the YES output of decision block 450, the logic arrives at a further decision block 458. The state of CASE is examined, and if it is TOP CASE, the logic flows to a block 460, in which CASE is set to BOTTOM CASE, and TOP PT is set equal to MAX PT, which was determined during the first pass. The logic flows by logic paths 462 and 456 back to block 434 to begin another pass through the logic of FIG. 4b. During this third pass, another line is calculated, this time between points 526 and 518. This line is tested and will conform to any intermediate points (none shown in FIG. 5) within ϵ. When the logic arrives a second time at decision block 458, the state of CASE is again tested. This time, CASE = BOTTOM, so the logic exits decision block 458 by the NO path to arrive at END block 464.

As so far described, the equations for the leading edges of a mailpiece were established. An assumption may be made that the fan-out of the mailpieces on the moving web leaves a space having a finite dimension between adjacent leading edges, such as two inches (5 cm). With such an assumption, conventional robotic control may be used to grasp the leading mailpiece (54 of FIG. 5) one inch from its leading edges 514 and 516, which is half-way between its edges 514 and 516 and the leading edge or edges of the next adjacent mailpiece (554 of FIG. 5). If the assumption of some particular spacing between leading edges of adjacent mailpieces is undesirable, some other conventional method may be used to establish the grasp point.

Other embodiments of the invention will be apparent to those skilled in the art. For example, the contrasting stripes described in conjunction with FIG. 1 are parallel to the direction of motion of the conveyor. However, they might be transverse if the locations of lateral edges was desired. The feed function performed by feed arrangement 24 of FIG. 1 may be performed manually, if desired. If workpieces having three or more possible leading edges are to be handled, the case flag must have more possible states, 5 and further loops must be added to the arrangement of FIG. 4b by addition of further decision blocks similar to 458 for identifying the further case states.

What is claimed is:

1. An apparatus for manipulating substantially flat, rectangular workpieces having at least one edge; comprising:
   a support surface for said workpieces, said support surface being patterned with parallel, mutually contrasting, elongated stripes;
   transport means coupled to at least said workpieces for causing motion of said workpieces in a direction parallel with said stripes;
   imaging means optically coupled to at least a portion of said support surface for forming an image of said portion of said support surface, and such portions of said stripes, and such workpieces as may be thereupon, and for generating video signals representing said image;
   location signal generating means coupled to said imaging means, for processing said video signals in such a manner as to generate location signals representative of the location along at least some of said stripes of said edge of said workpiece;
   line fitting processing means coupled to said location signal generating means for fitting data representative of at least one line to at least some of said location signals, whereby said data represents the location of at least one edge of said workpiece; and
   manipulating means coupled to said line fitting processing means and responsive to said data for manipulating said workpiece.

2. An apparatus for manipulating substantially flat, rectangular workpieces having at least one edge, comprising:
   an elongated conveyor belt for supporting said workpieces, said conveyor belt being patterned with parallel, mutually contrasting, elongated stripes;
   transport means coupled to at least said workpieces for causing motion of said workpieces in a direction parallel with said stripes;
   imaging means optically coupled to at least a portion of said conveyor belt for forming an image of said portion of said conveyor belt, and such portions of said stripes and workpieces as may be thereupon, and for generating video signals representing said image;
   location signal generating means coupled to said imaging means, for processing said video signals in such a manner as to generate location signals representative of the location along at least some of said stripes of said edge of said workpiece;
   line fitting processing means coupled to said location signal generating means for fitting data representative of at least one line to at least some of said location signals, whereby said data represents the location of at least one edge of said workpiece; and
   manipulating means coupled to said line fitting processing means and responsive to said data for manipulating said workpiece.

3. An apparatus according to claim 2 wherein said transport means comprises prime moving means coupled to said conveyor belt.

4. An apparatus according to claim 1, wherein said imaging means comprises a television camera.

5. An apparatus according to claim 4, wherein said television camera is a line-scan camera for initiation and production of line scans, and said line scans are substantially parallel with said stripes.

6. An apparatus according to claim 5, wherein said location signal generating means comprises counting means enabled at said initiation of at least some of said line scans for counting until a transition of said video signals, to produce said location signals.

7. An apparatus according to claim 1, further comprising general illumination means for continuously illuminating at least said portion of said support surface with incoherent light.

8. An apparatus according to claim 1 further comprising gating means coupled to said location signal generating means and adapted for blocking at least some of said location signals from reaching said line fitting processing means.

9. An apparatus according to claim 1, wherein said line fitting processing means comprises means for fitting a line between upper and lower locations identified by said location signals.

10. An apparatus according to claim 9, wherein said line fitting processing means comprises means for determining the deviation between said line and each of said locations identified by said location signals.

11. An apparatus according to claim 10 further comprising means for establishing that one of said locations exhibiting the maximum deviation from said line.

12. An apparatus according to claim 11, further comprising means for causing said line fitting processing means to fit a second line between that one of said locations exhibiting the maximum deviation from said first-mentioned line and one of said upper and lower locations.

13. An apparatus according to claim 12, further comprising means for causing said line fitting processing means to fit a third line between that one of said locations exhibiting the maximum deviation from said first-mentioned line and the other one of said upper and lower locations.

14. An apparatus according to claim 1, wherein said manipulating means comprises vacuum gripping means.

15. A method for determining the location of an edge of a workpiece, comprising the steps of:
  placing said workpiece on a surface bearing a pattern of a plurality of mutually contrasting stripes;
  illuminating a portion of said surface;
  imaging said portion of said surface and any workpiece overlying said stripes to thereby produce video signals representing scans parallel to said stripes;
  generating transition signals representative of the transitions between at least some of said stripes and an edge of said workpiece;
  measuring the time between a reference signal and each of said transition signals to produce location signals representative of the location of said edge of said workpiece;
  gating at least some of said location signals corresponding to edges of said stripes to produce gated location signals, to thereby eliminate spurious transitions attributable to deviations of said scans and said stripes from a mutually parallel condition; and
  identifying top and bottom locations representing upper and lower extremes of said edge of said workpiece from said gated location signals, and calculating a line between said top and bottom locations.

16. A method for determining the location of the edge of a workpiece, comprising the steps of:
  placing said workpiece on a surface bearing a pattern of a plurality of mutually contrasting stripes;
  illuminating at least a portion of said surface with incoherent light;
  imaging said portion of said surface and any workpiece overlying said stripes to thereby produce video signals representing scans parallel to said stripes;
  generating transition signals representative of the transitions between at least some of said stripes and an edge of said workpiece;
  measuring the time between a reference signal and each of said transition signals to produce location signals representative of the location of said edge of said workpiece;
  gating at least some of said location signals corresponding to edges of said stripes to produce gated location signals, to thereby eliminate spurious transitions attributable to deviations of said scans and said stripes from a mutually parallel condition; and
  identifying top and bottom locations representing upper and lower extremes of said edge of said workpiece from said gated location signals, and calculating a line between said top and bottom locations.

17. A method according to claim 15 further comprising the steps of:
  calculating the deviation of each of said locations represented by said gated location signals from said line; and
  identifying that location having the greatest deviation.

18. A method according to claim 17 further comprising the steps of:
  calculating two further lines extending between said location having the greatest deviation and said TOP and BOTTOM locations.

* * * * *